Jan. 25, 1938.  H. D. COLMAN  2,106,167
SELF ADJUSTING BRAKE
Filed March 15, 1935  6 Sheets-Sheet 1

INVENTOR
Howard D. Colman
BY
Parker, Carlson, Pitzner & Hubbard
ATTORNEYS

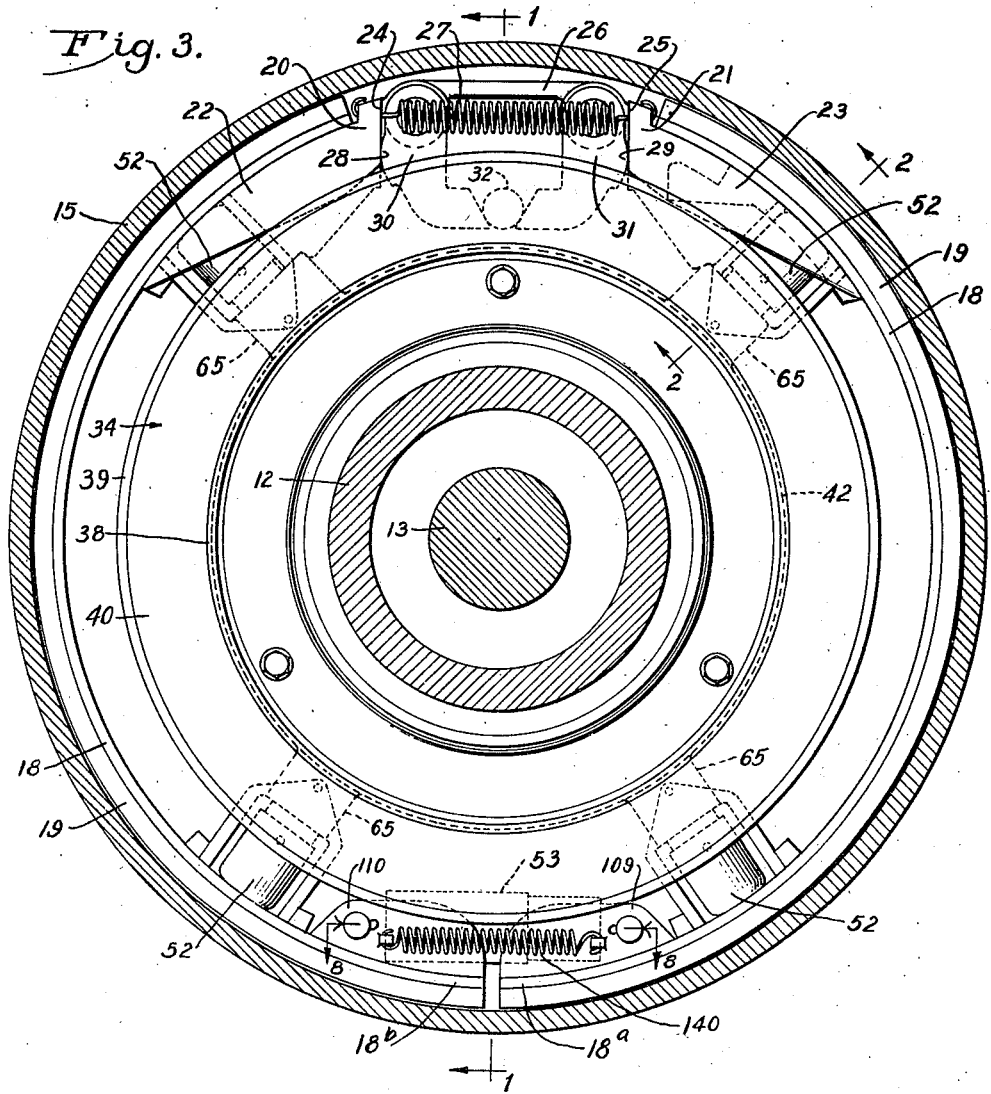

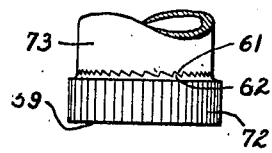
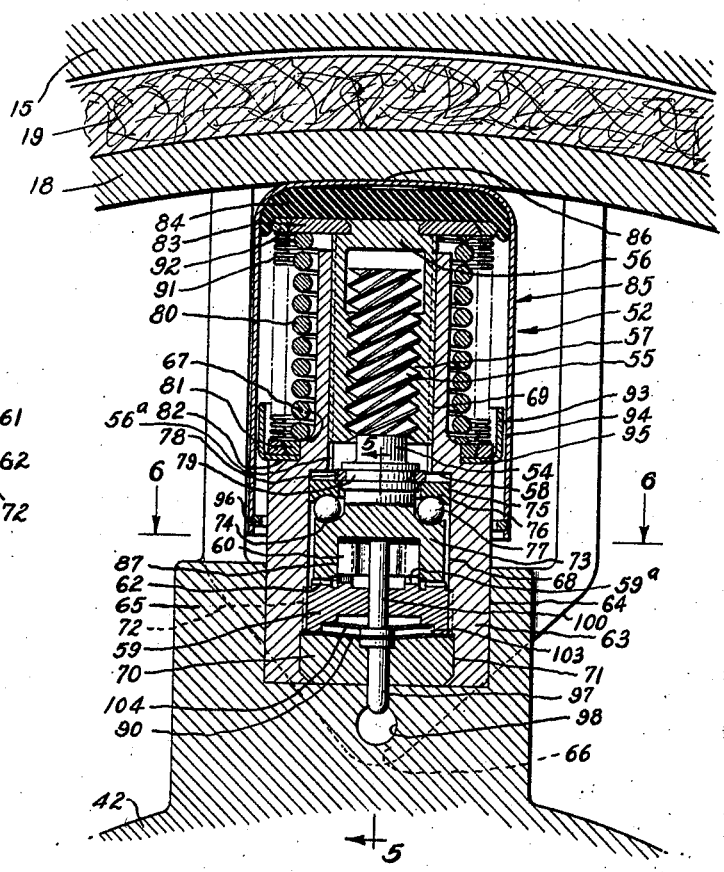
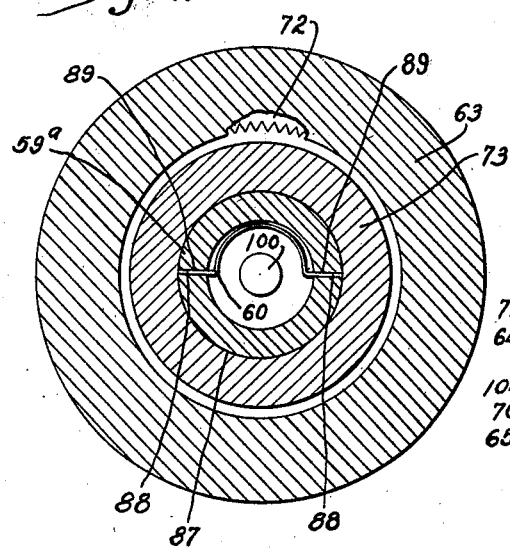
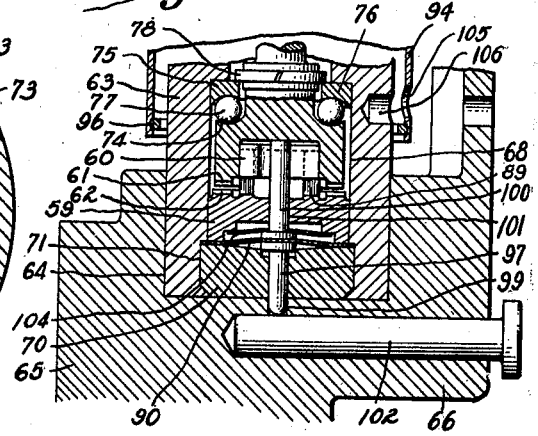

Jan. 25, 1938. H. D. COLMAN 2,106,167
SELF ADJUSTING BRAKE
Filed March 15, 1935 6 Sheets-Sheet 4
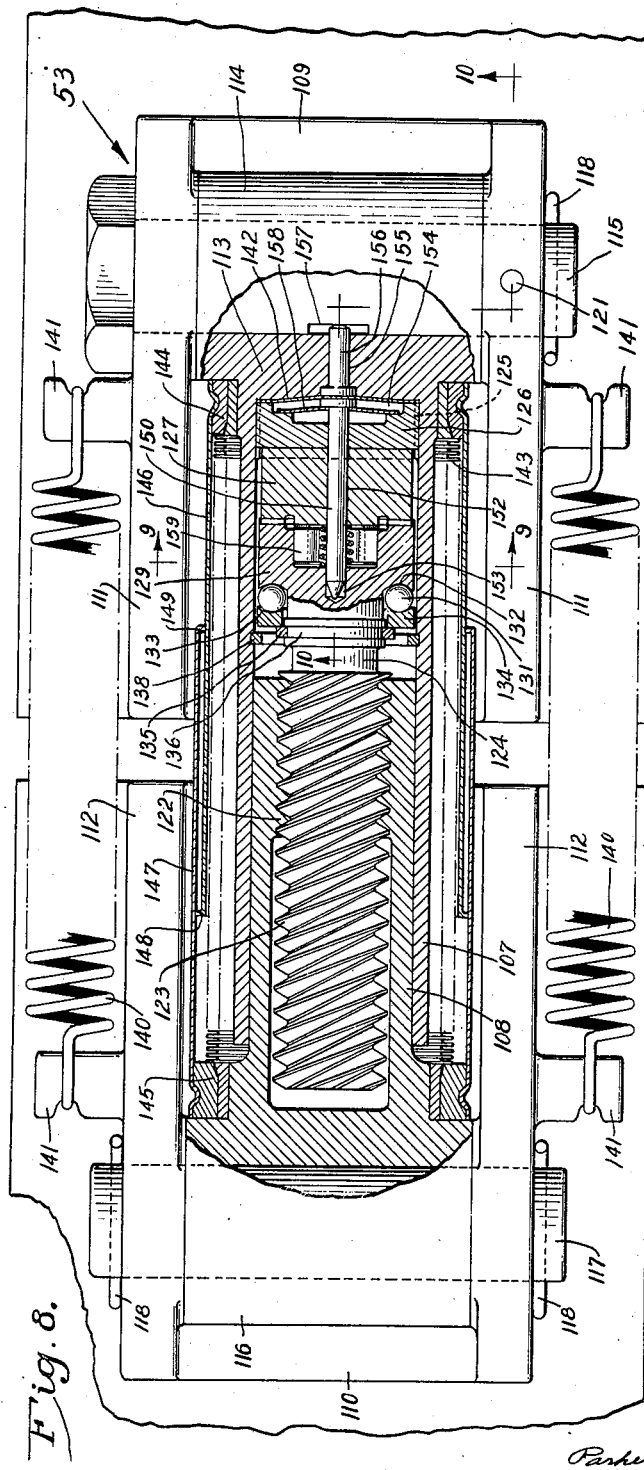
INVENTOR
Howard D. Colman
BY
Parker, Carlson, Pitner & Hubbard
ATTORNEYS

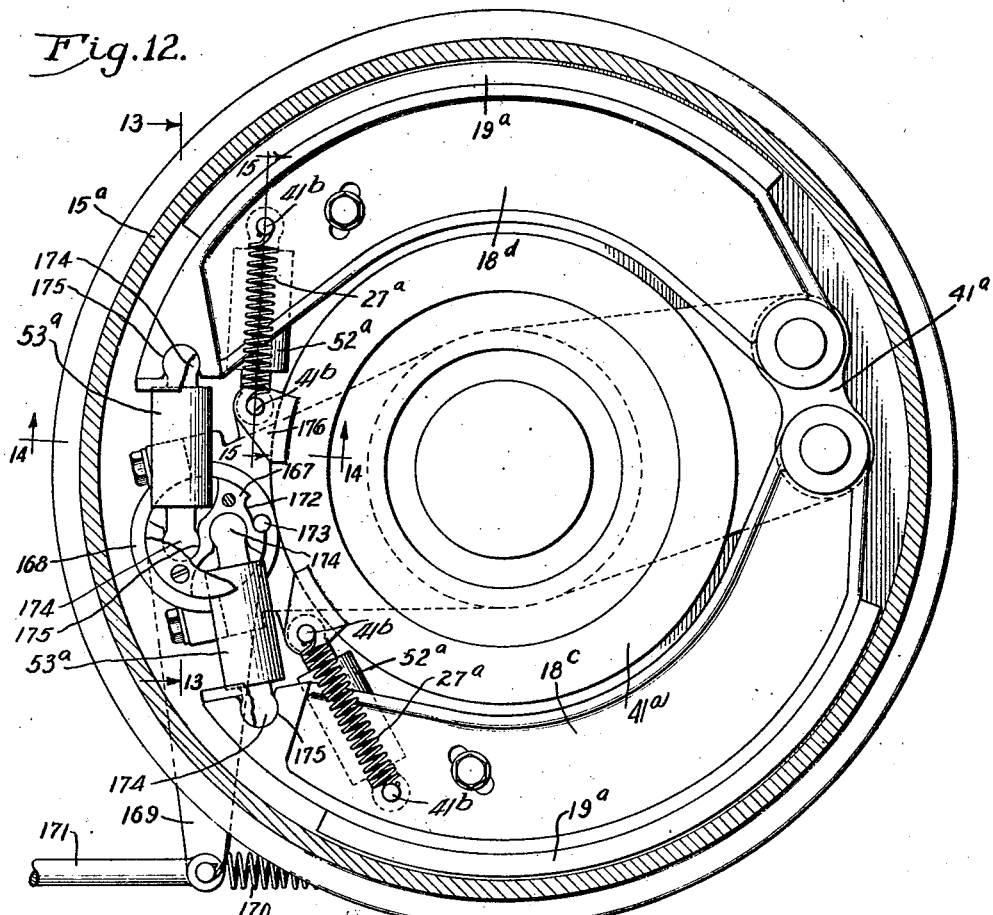
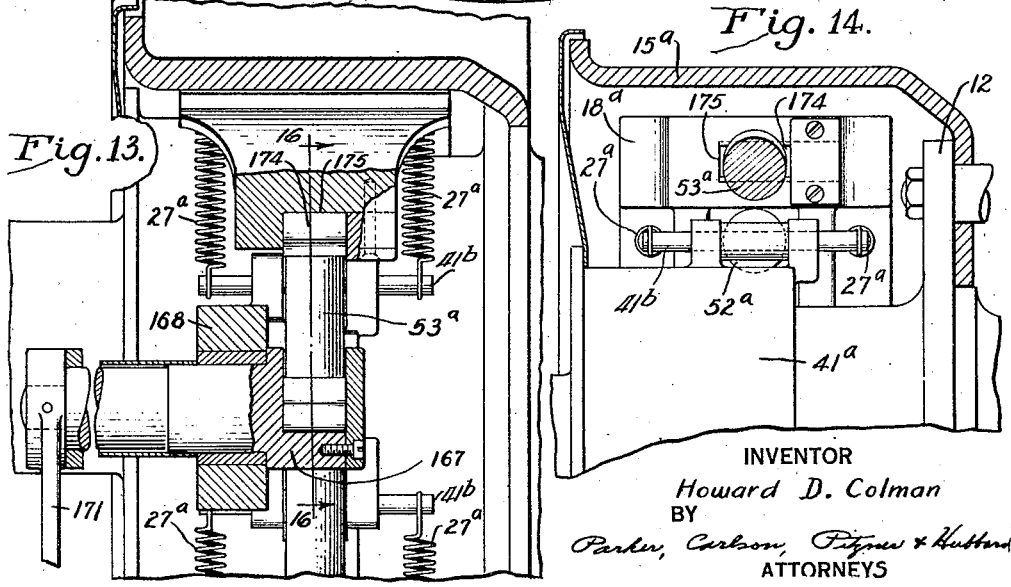

Jan. 25, 1938.                H. D. COLMAN                2,106,167
                           SELF ADJUSTING BRAKE
                   Filed March 15, 1935        6 Sheets-Sheet 6
Fig. 15.
Fig. 16.
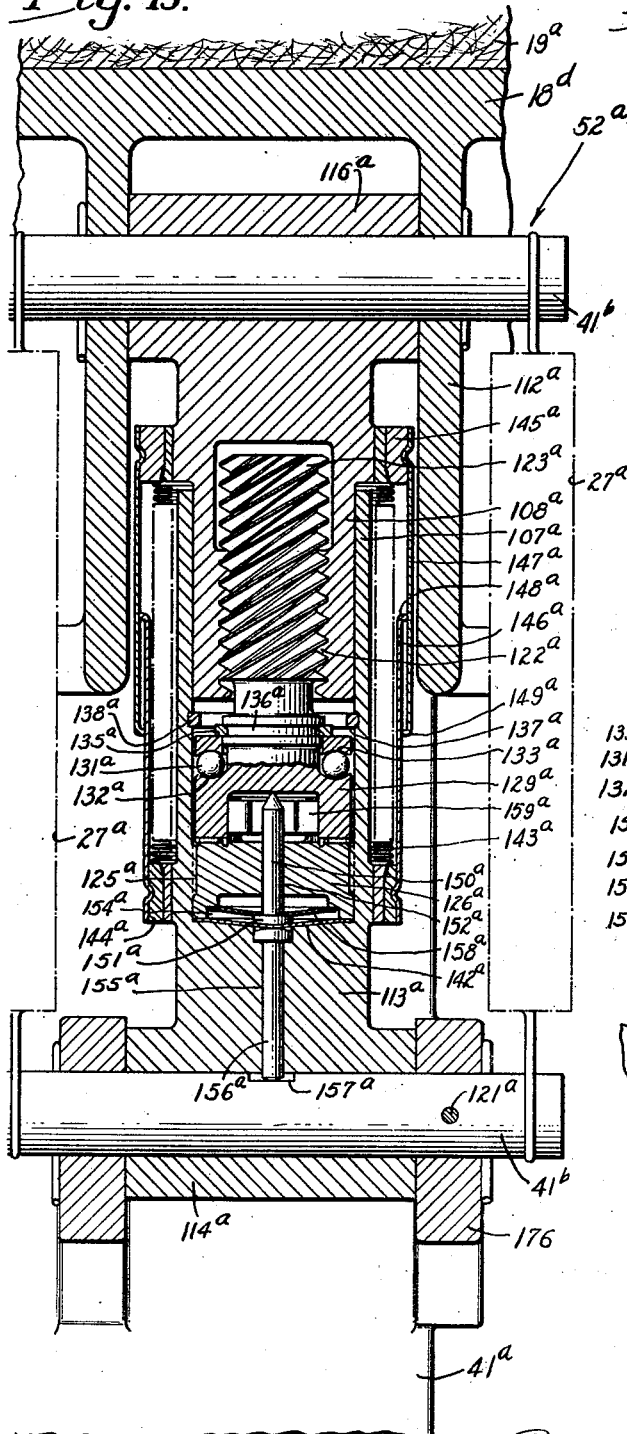
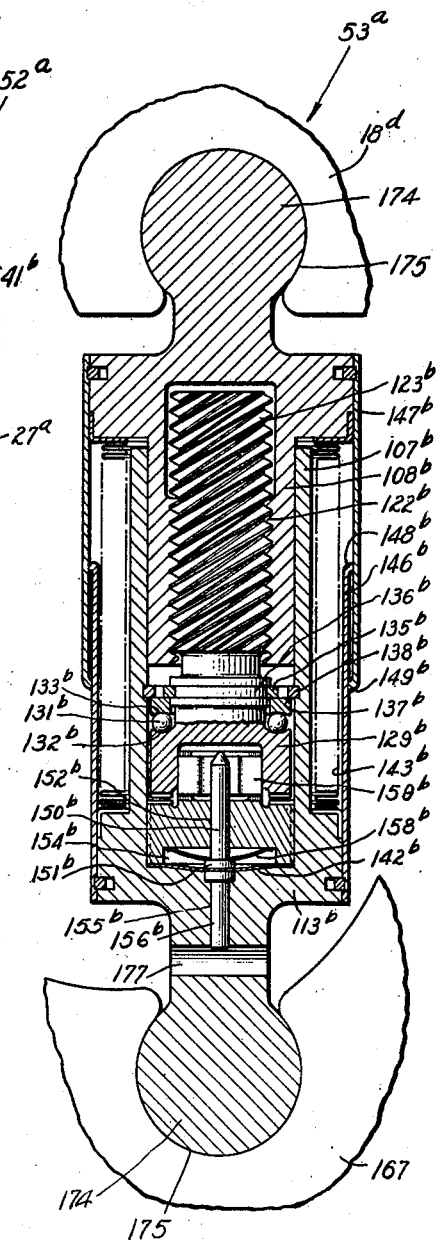
INVENTOR
Howard D. Colman
BY
Parker, Carlson, Pitner & Hubbard
ATTORNEYS Patented Jan. 25, 1938

2,106,167

UNITED STATES PATENT OFFICE 2,106,167

SELF-ADJUSTING BRAKE

Howard D. Colman, Rockford, Ill.

Application March 15, 1935, Serial No. 11,352

40 Claims. (Cl. 188—79.5)

The present invention relates generally to improvements in brakes for rotary members, and more particularly to vehicle brakes which are self-adjustable to compensate automatically for wear.

The invention is especially suited for automobile brakes which commonly have a plurality of anchored or floating shoes or a band, and actuating means manually operable from a foot pedal for expanding the shoes or band outwardly into frictional engagement with a rotatable drum. The actuating means may be any one of a well-known number of types, for example, the mechanical, hydraulic, vacuum, air pressure, magnetic, or "so-called" power type. For efficient braking, the amount of movement required for actuation of the internal braking element into engagement with the drum should remain substantially constant and uniform throughout the entire life of the brake lining so that the range of movement of the actuating means will remain fixed in phase and extent, and that the action of the various brakes of the automobile will always be equal.

The brakes now in common use do not satisfactorily fulfill these conditions. As wear on the lining occurs, the applying movement increases, thereby increasing the required movement of the foot pedal. Hence, approximately two-thirds of the motion of the foot pedal is utilized to cover the wear range, and only the remaining one-third thereof is available for the operating range. To keep the maximum range of pedal movement down to a practical limit, it has therefore been customary to provide foot pedals having a relatively small leverage and requiring a correspondingly large force. If the pedal movement were always available to cover a constant operating range, a much greater leverage could be employed to obtain a heavier braking action with the same manual effort. Without self-adjustment for wear, the braking action on the various wheels of the automobile also tends to become unequal. This is particularly objectionable in front wheel brakes because of its effect on steering in various commonly used constructions.

One of the primary objects of the present invention therefore is to provide a vehicle brake with novel means for limiting the retractile movement of the operable friction element and the actuating means therefor to a predetermined clearance at all times.

A further object resides in the provision of new and improved means of the foregoing character which is self-adjustable to compensate automatically for wear on the brake lining, which is sensitive and accurate in operation, which is not subject to adjustment by vibration or other extraneous forces, and which will not be influenced by grit, dirt or other foreign matter, but will remain efficient in operation throughout its required life.

A more specific object is to provide the operable braking element with a plurality of novel radial clearance stops self-adjustable to compensate for wear, and a novel circumferential connecter for separate parts of the element, such as shoes or sections of a drum, self-adjustable to compensate for expansion of the element by the radial stops, and thereby to maintain the motion of the brake actuating means constant.

Other objects reside in the provision of a vehicle brake assembly with radial clearance stops and a circumferential connecter of the foregoing character, each of which comprises two coacting screw members having non-locking threads, one member being axially movable from an idle position first through a predetermined clearance and then to effect relative rotation between the members by reason of the coaction of the threads, brake means for resisting such relative rotation, and clutch means for preventing such relative rotation when said one member is in idle position.

A further object is to provide novel means for preventing misadjustment, and particularly overadjustment, as a result of the violent accelerations to which the adjusters may be subjected in the normal use of the vehicle.

An important object is to provide a novel extensible housing for hermetically sealing each screw device within an enclosed space adapted to contain and retain a lubricant for the moving parts, and serving to exclude completely all dirt, grit and other foreign matter which would interfere with satisfactory and continued operation.

Still another object resides in the provision of a new and improved means for resetting each screw device without breaking the hermetic seal upon replacement of the brake lining.

Further objects reside in the provision of a novel magnetic power actuator for the brake.

Other objects and advantages will become apparent as the description proceeds.

In the accompanying drawings, Figure 1 is an axial sectional view, taken along line 1—1 of Fig. 3, of a wheel brake embodying the features of my invention.

Fig. 3 is a transverse sectional view of the entire brake taken along line 3—3 of Fig. 1, and illustrating the location of the various self-adjusting devices.

Fig. 4 is an axial sectional view, on an enlarged scale, taken along line 4—4 of Fig. 2, and illustrating one of the self-adjustable radial clearance stops.

Fig. 5 is a fragmentary axial sectional view taken along line 5—5 of Fig. 4, and illustrating the means for resetting the adjusting mechanism.

Fig. 6 is a transverse sectional view, on a still larger scale, taken along line 6—6 of Fig. 4.

Fig. 7 is a fragmentary detail view showing a portion of the adjusting mechanism in side elevation.

Fig. 8 is a fragmentary longitudinal sectional view, on an enlarged scale, taken along line 8—8 of Fig. 3, and illustrating the circumferential connecter.

Fig. 9 is a transverse sectional view of one of the clutch elements of the circumferential connecter taken along line 9—9 of Fig. 8, the external enclosing parts being omitted.

Fig. 10 is a fragmentary sectional view taken along line 10—10 of Fig. 8, and illustrating the resetting means.

Fig. 11 is a fragmentary side elevational view illustrating the means for preventing adjustment when the parts are subjected to an excessive axial acceleration.

Fig. 12 is a transverse sectional view of another form of wheel brake embodying the self-adjusting devices.

Figure 1:
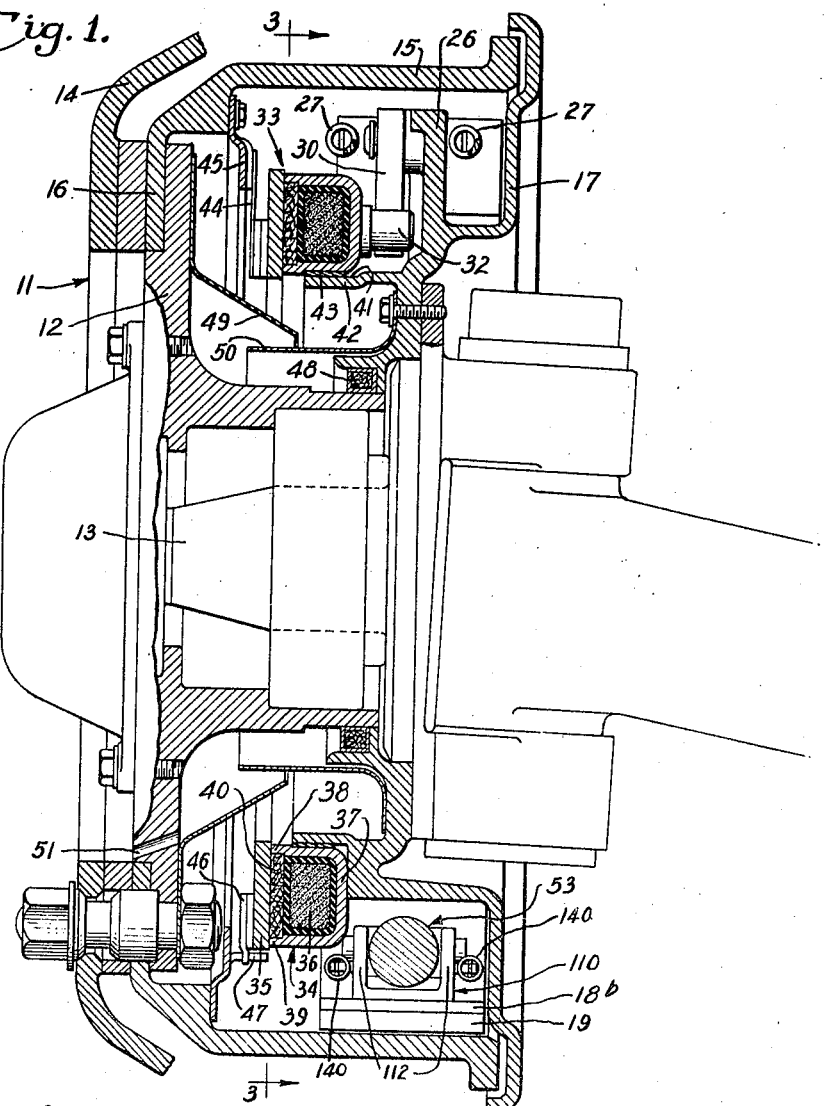
Figure 2:
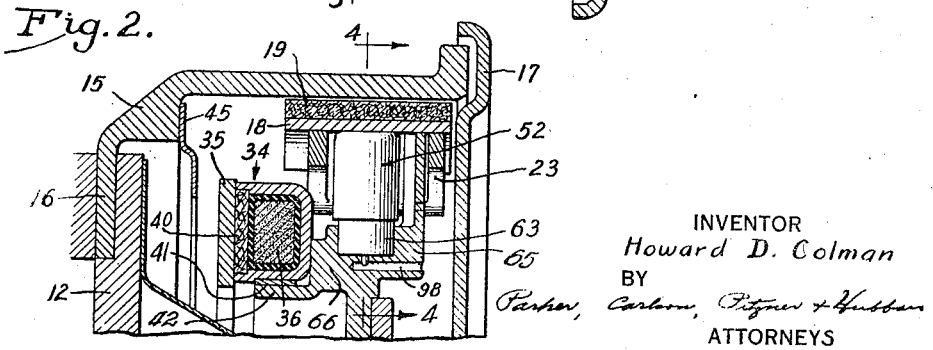
Fig. 2 is a fragmentary axial section of the brake taken along line 2—2 of Fig. 3.

Figs. 13 and 14 are fragmentary sectional views taken respectively along lines 13—13 and 14—14 of Fig. 12.

Fig. 15 is a sectional view on an enlarged scale taken along line 15—15 of Fig. 12.

Fig. 16 is a sectional view on an enlarged scale taken along line 16—16 of Fig. 13.

The present invention in its broad aspects is adaptable to different brakes for a large variety of purposes. It is especially suited for and hence disclosed in connection with an automotive vehicle wheel brake. One particular type of wheel brake is shown, but it is to be understood that the invention is not limited in all respects to any one type or to the preferred details of the self-adjusting devices, but is intended to cover all equivalent, modified and alternative constructions coming within the spirit and scope of the appended claims.

Referring more particularly to the drawings, the brake is mounted on the front wheel 11 of a truck or other motor vehicle. The wheel 11 comprises a central disk 12 suitably mounted for rotation on an axle 13, and a flange 14 for supporting the rim (not shown).

In its preferred form, the brake comprises a cylindrical drum 15 rotatable with the wheel 11. In the present instance, the drum 15 has an annular flange 16 at one end rigidly secured between the disk 12 and flange 14, and is open at the other end. A stationary backing plate 17 is mounted within and substantially closes the inner end of the drum 15.

The brake preferably is of the internal type with its mechanism mounted within the enclosed space between the disk 12 and the plate 17, and comprises a braking element 18 with an external brake lining 19 movable into and out of frictional engagement with the interior of the drum 15. The braking element 18 is shown in the form of a yieldable circumferential split band adapted for expansion and contraction through a braking clearance. Channel-shaped brackets 20 and 21, with inwardly extending longitudinal parallel side flanges 22 and 23, are secured respectively to the inner surfaces of the ends of the band 18, and have flat end faces 24 and 25 adapted to engage respectively with opposite sides of a bracket 26 rigidly mounted on the backing plate 17 and constituting a stop abutment. Suitable tension springs 27 are anchored at their opposite ends to the brackets 20 and 21, and tend to retract the band 18 from the drum 15. The end faces 24 and 25 also respectively engage suitably rounded cam abutments 28 and 29 on two transversely disposed cam levers 30 and 31 pivotally mounted at their outer ends on the bracket 26. The inner ends of the levers 30 and 31 are formed with oppositely inclined faces adapted to engage opposite sides of an actuator pin 32 when in retracted position.

Any suitable means may be provided for moving the actuator 32 circumferentially of the brake in either direction out of the neutral position shown in Fig. 3 to apply the brake, and in the present instance this means is shown as an electromagnetic pilot clutch 33 (Fig. 1). In its preferred form, the clutch 33 comprises an annular magnet 34 mounted for limited rotation on the backing plate 17, and an axially movable armature 35 rotatable with the drum 15. The magnet 34 consists of an annular coil 36 mounted within a housing 37 of magnetic material U-shaped in cross-section and having inner and outer concentric flanges defining pole faces 38 and 39 at their outer edges. A flat ring 40 of a suitable friction material is seated against the coil 36 between the pole faces 38 and 39, and is substantially flush with the latter. The coil housing 37, to one side of which the actuator pin 32 is rigidly secured, is rotatably mounted and axially positioned in an annular seat or notch 41 formed in the end of a concentric flange 42 on the inside of the backing plate 17. A thin bearing ring 43 preferably is interposed between the housing 37 and the cylindrical surface of the seat 41.

The armature 35 is in the form of a flat annular disk of magnetic material, and is supported for axial movement by a plurality of spring straps 44 from an outwardly spaced annular flange member 45 secured to the drum 15. The straps 44 extend along chords of the circumference of the flange member 45, and hence will resist the rotational torque when subjected to tension as in one direction of rotation. Interfitting radial and laterally projecting fingers 46 and 47 respectively on the armature 35 and flange member 45 are provided to take the rotational torque in the reverse direction.

To prevent lubricant in the wheel bearing from reaching the friction surfaces of the clutch 33, a packing 48 is interposed between the hub of the disk 12 and the backing plate 17. Two overlapping baffles 49 and 50 are provided to direct any lubricant that may escape from the wheel bearing to a plurality of discharge openings 51 in the disk 12. Preferably, the baffle 49 is conical in shape and secured to the disk 12 closely about the series of openings 51, and the baffle 50 is cylindrical in form and secured to the backing plate 17 and projects into the baffle 49.

The armature 35 is held in direct bearing engagement with the magnet 34, and completes the flux circuit across the pole faces 38 and 39. When the brake is released, the friction surfaces of the clutch 33 slip since the pressure exerted by the spring straps 44 is light. To apply the brake, the coil 36 is energized. Control means for this purpose are well-known in the art, and hence no specific means is disclosed herein. For automobile or truck brakes, the circuits for the coil 36 may include a rheostat switch (not shown) operable by a brake foot pedal (not shown). Upon such energization, the pull on the armature 35 increases the clutch pressure sufficiently to effect rotation of the magnet 34 and the pin 32. If the drum 15 is rotating in one direction, as in forward travel of the vehicle, the pin 32 will actuate the lever 30 to impart braking pressure to the end 24 of the band 18. This pressure will be transmitted through the band 18 against the remote side of the abutment 26, and will cause expansion of the band into frictional engagement with the drum 15. Since the brake band 18 is yieldable, a servo-action will be obtained. Upon reverse rotation of the drum 15, as in rearward travel, the lever 31 will be actuated to apply the brake in a similar manner. When the coil 36 is deenergized, the springs 27 will retract the band 18 and return the parts, namely the band ends 24 and 25, the levers 30 and 31, the pin 32 and the magnet 33, to centered or neutral position.

Means is provided for automatically adjusting the brake to compensate for wear on the brake lining 19. To fully compensate for the effects of wear, the adjustment is made to carry out two functions regardless of the form or type of the brake to which the invention may be applied.

The first function is to maintain a constant predetermined clearance between the drum 15 and the braking element or band 18. In the brake illustrated in Figs. 1 to 11, a plurality of radial clearance stops 52, which are self-adjustable to compensate automatically for wear on the brake lining 19, are mounted in position to support the braking element or band 18 when the brake is released. In the present instance, four of the stops 52 are shown in a particular environment and relationship to the braking element 18, but it is to be understood that the expression "radial clearance stop" or any equivalent expression, as used herein and in the appended claims, is intended to define any suitable adjusting means which will automatically perform the first function to insure that the radial clearance will be substantially uniform throughout the circumference, and will remain substantially constant for the life of the lining 19.

The second function is to maintain substantially constant the extent of movement of the brake actuator regardless of adjustments for maintaining a constant braking clearance. This function may be carried out in any suitable manner, and preferably by adjusting the circumferential dimension of the braking element and actuator assembly in accordance with changes in the idle position of the braking element relative to the axis of the wheel. For convenience, any adjuster for performing the second function is herein designated as a "circumferential adjuster."

In the embodiment of Figs. 1 to 11, a circumferential adjuster 53, automatically extensible in response to axial tension, is provided to increase the effective length of the braking element 18 in response to the diametrical adjustments by the stops 52 so that the range of movement of the actuator pin 32 will remain constant regardless of wear. The adjuster 53 serves as a floating pivotal connection, diametrically opposite the actuator 32, for two sections 18a and 18b of the band 18.

The radial clearance stops 52 are alike in construction, and hence a description of one will suffice for all. The stop 52 illustrated in Figs. 4 to 7 comprises inner and outer screw members 54 and 56 having coacting non-locking threads 55 and 57. One of the members 54 and 56 is adapted for axial movement radially with the band 18, while the other is adapted for engagement with a stop shoulder 58 to limit its outward axial movements. Also, one of the members is mounted for rotation, while the other is non-rotatable. In the present instance, the inner member 54 is rotatable, and adapted to be restrained against substantial outward movements by the shoulder 58, and the outer member 56 is non-rotatable, and free to move axially with the band 18 upon applying and releasing the brake. The member 56 may be held against rotation in any suitable manner, and preferably is formed externally with a plurality of longitudinal splines forming part of a spline connection 56a referred to hereinafter. Thus, the screw members 54 and 56 constitute a self-adjustable device in which the non-locking screw threads 55 and 57 will effect a relative rotation and hence an automatic elongation when subjected to axial stress.

To permit a limited outward movement of the screw member 56 through the desired radial braking clearance without effecting an adjustment, a lost motion is provided which must be taken up before the threads 55 and 57 will be subjected to an appreciable axial stress. In the present instance, the lost motion is provided for by mounting a fixed rest or stop 59 in position for engagement by the inner end of the screw member 54 to limit the retractile movement of the member 56 and hence of the band 18, and by spacing the stop 59 an axial distance from the shoulder 58 such that the members will move outwardly as a floating unit through the desired distance before the member 54 will engage the stop shoulder.

During the application and release of the brake, the screw member will move between the shoulder 58 and the stop 59, and while the brake is applied may be suspended therebetween if the braking clearance is less than the desired maximum. The weight of the movable parts, vibration, sharp accelerated movements of the wheel axle particularly in directions generally parallel to the axis of the stop 52, and other extraneous influences, such as are commonly encountered in motor vehicle operation, if not rendered ineffective, would be likely to cause misadjustment. Hence, a brake 60 (see Fig. 6) is provided to impart a slight resistance to rotation of the screw member 54. Since stresses set up by accelerated movements are proportional to mass, the mass of the screw members 54 and 56 is kept small, and the lead of the threads 55 and 57 is so correlated to the action of the brake 60 that unwarranted rotation of the member 54 will be prevented without materially reducing the sensitivity and responsiveness of the device.

A clutch is provided to prevent reverse rotation of the screw member 54 when the latter is abutting the stop 59 and the screw device is under compression by reason of the retractile force of the band 18. The clutch may be of any suitable type and associated with the member 54 in any desired manner or location, but preferably comprises coacting crown teeth 61 and 62 (see Fig. 7) respectively on the abutting surfaces of the member and the stop 59. Thus, the teeth 62 in effect constitute the stop.

In the preferred construction of the radial clearance stop 52, the parts thus far described are mounted in a generally cylindrical radially disposed case or shell 63. The inner end of the case 63 is securely mounted in an outwardly opening recess 64 formed in the flange 42, and closed at its inner end. The recess 64 more particularly is defined by a tubular radial projection 65 on the outside of the flange 42 and having an inner end wall 66. The inner end portion of the case 63 is larger in diameter than the outer end portion, which is formed internally with longitudinal splines slidably interfitting with the splines on the member 56 to complete the spline connection 56ª, and hence defines an annular outwardly facing shoulder 67 at the base of the latter. Two intercommunicating bores 68 and 69 of relatively large and small diameters open respectively through the inner and outer end portions of the case 63, and at their juncture define the annular inwardly facing stop shoulder 58. The inner end of the bore 68 is closed by a plate 70 secured within a counterbore 71, and resting against the end wall 66. Secured within the bore 68 and against the plate 70, as by means of knurls 72 is a circular disk, defining the stop 59, in axially opposed relation to the shoulder 58.

The inner screw member 54 projects axially into the bore 68, and has an enlarged head 73 adapted in its innermost position to abut the stop 59. Formed in the base end of the head 73 about the shank of the screw member 54 is an upwardly facing annular ball raceway 74. A ring 75, formed with an opposed raceway 76, encircles the shank, and is adapted for movement therewith from its innermost position through a predetermined clearance A into engagement with the operating stop shoulder 58. Suitable ball bearings 77 are interposed between and in engagement with the raceways 74 and 76. The ring 75 is held in bearing engagement with the balls 77 by a split retainer ring 78 radially overlapping the ring 75, and sprung into an annular groove 79 in the shank of the screw member 54. It will be evident that the inner screw member 54 is permitted a limited axial movement through the clearance A between the fixed stop 59 and the shoulder 58, and that it is freely rotatable when in its outermost position.

The outer screw member 56 is slidably mounted in the bore 69, and projects outwardly therefrom for coaction with the brake band 18. In the preferred construction, the screw member 56 does not have a direct mechanical connection with the band 18 so that the latter is free for movement laterally thereof, such as might result in the application of the brake, in circumferential adjustment for wear, or by reason of a servo-action, but is caused to follow the band outwardly under the influence of spring pressure. When the brake is released, the screw member 56 is moved inwardly by the band 18 in response to the retractile action of the springs 27. More specifically, the screw member 56 is urged outwardly by a coiled compression spring 80 which loosely encircles the outer end portion of the case 63, and which abuts at its inner end against the shoulder 67 and a pair of interfitting concentric conical wedge rings 81 seated in an annular notch 82 in the latter. The outer end of the spring 80 abuts against a flat annular overhanging disk 83 rigidly secured to the outer end of the screw member 56. A circular layer 84 of heat insulating material is confined against the outer face of the disk 83 by an enclosing cap 85 having an end wall 86 in direct bearing engagement with and conforming generally to the curvature of the inner face of the band 18.

By locating the spring 80 outside of the case 63, a strong spring action for a given radial dimension of the stop 52 can be obtained, and the interior of the case need only confine the screw members 54 and 56. Hence, these members may be small in diameter so that their mass will be low, and the axial pitch of the threads 55 and 57 in relation to a powerful non-locking lead will be small. Because of this relatively small axial pitch, rotation of the screw member 54 through the distance of one tooth 62 will effect but a very small axial adjustment of the member 56, and hence a close and accurate compensation for wear will be obtained.

The clutch teeth 61 and 62 are formed respectively on the outer face of the stop disk 59 and the free end of the head 73, and are annularly arranged about the axis of the member 54. The teeth are fine, short and rugged, and preferably are provided in the form of serrations having inclined sides of a low angle adapted to seek full engagement, so as to retain the member 54 in initial position or upon adjustment in an advanced position of one or more teeth securely against the retractile force of the band 18. The height of the teeth 61 and 62 is less than the permissible extent of movement of the head 73 between the shoulder 58 and the stop 59 so that the teeth will be disengaged when the ring 75 engages the shoulder 58.

When the brake band 18 is in retracted position, the screw members 54 and 56 as a unit are located in their innermost position. The clutch teeth 61 and 62 are in full engagement, and the radial clearance between the drum 15 and the band 18 is determined by the relative adjustment of the members 54 and 56. Upon applying the brake, the spring 80 causes the screw member 56 to follow the band 18 outwardly. Initially, the screw members 54 and 56 move axially as a unit, and without being placed under axial stress by the brake applying action. If the outward movement of the band 18 does not exceed the clearance A, the head 73 will be located between the stop 59 and the shoulder 58, and hence no adjustment for wear will be obtained. However, if the outward movement is continued, the bearing ring 75 will engage the shoulder 58 to restrain the inner member 54 against further movement. In this position, the clutch teeth 61 and 62 are fully disengaged. Still further movement of the outer member 56 will place the screw device under tensile stress, and thereupon the screw threads 55 and 57 will effect a rotary adjustment of the inner member 54 proportionate to the excess movement. Upon the release of the brake, the screw device will be returned to its innermost position. If the rotary adjustment of the member 54 did not exceed the length of one clutch tooth, the inclined sides of the teeth 61 and 62 will rotate the member in a reverse direction into its original position. If the rotary adjustment exceeded the distance of one or more of the clutch teeth, the clutch 61, 62 will lock the member 54 in a new position of adjustment to reduce the braking clearance of the band 18.

The brake 60 for holding the screw member 54 against unwarranted rotation when in suspended position between the stop 59 and the shoulder 58, as for example during outward or inward movement, or while the brake is applied, is provided in the form of a semi-circular compression bow spring mounted within a tubular extension 59ª of the stop 59. The extension 59ª projects into an axial bore 87 in the free end of the head 73. The spring 60 has radial ends 88 which extend slidably through slots 89 in the peripheral wall of the extension 59ª into frictional end engagement with the surface of the bore 87. The braking action of the spring ends 88 is sufficiently strong to prevent rotation of the member 54 by reason of the weight of the parts, vibration, momentum or other outside influence to which the self-adjusting device may be subjected, particularly on motor vehicles, but is so correlated to the lead of the threads 55 and 57 and the mass of the parts that it will permit sensitive and accurate adjustment for wear.

To prevent impairment of the efficiency and life of the device by reason of the deleterious effect of grit, dirt, water and other foreign matter, and the loss of proper lubrication, the self-adjusting parts are enclosed in an hermetically sealed space. In the present instance, the inner end of the case 63 is sealed by a diaphragm 90 clamped against the end shoulder of the counterbore 71 and the stop disk 59 by the end plate 70 with sufficient force to obtain a tight joint, and the outer end is sealed from the atmosphere by a corrugated cylindrical bellows 91 concentrically encircling the spring 80 and having a tight connection at its ends respectively with the exterior of the case at the shoulder 67 and the disk 83. The inner end of the bellows 91 is tightly secured between the inner and outer conical wedge surfaces of the two clamp rings 81. The outer end of the bellows 91 is similarly secured between the disk 83 and an encircling wedge clamp ring 92. The bellows 91 is formed with small deep convolutions and is made of a light thin material so as to be readily extensible through the desired range of adjustment without undue deformation, and to permit free and substantially unrestrained operation of the self-adjusting device.

The longitudinal spline connection 56ª is provided between the case 63 and the screw member 56 to hold the latter against rotation. It is to be noted, however, that the bellows 91 will resist such rotation.

Preferably, the bellows 91 is enclosed in an outer housing which comprises telescoping cylindrical shells 93 and 94, and which affords protection against mechanical injury and prevents the accumulation of dirt and other foreign matter. The shell 93 has an inner peripheral flange 95 secured in the notch 82 between the case 63 and the rings 81, and encircles the inner end portion of the bellows 91. The outer shell 94 is formed by extending the cylindrical wall of the cap 85. A stop ring 96 is secured within the free end of the shell 94, and is adapted for engagement with the flange 95 to limit the maximum outward adjustment of the member 56.

The screw device 54, 56 is adjusted progressively to compensate for wear on the brake lining 19. When the lining 19 is replaced, the device is reset into its initial position. To permit such resetting without breaking the hermetic seal, a pin 97 extends slidably from a transverse bore 98 in the wall 66 through a series of aligned axial bores 99, formed respectively in the wall and the plate 70 into engagement with one side of the diaphragm 90. An aligned pin 100 has an enlarged head engaging the other side of the diaphragm 90, and extends slidably through an axial bore 101 in the stop disk 59 for engagement with the end of the screw member 54. The pin 97 is rounded at its inner end for cam engagement with a release plunger 102 manually slidable in the bore 98. Formed in the stop disk 59 about the pin 100 is a circular recess 103 permitting flexing of the diaphragm 90 away from the plate 70. A spring spider 104, mounted under compression within the recess 103, engages the head of the pin 100, and tends to urge the assembly of the pins 97 and 100 and the diaphragm 90 into inoperative position for actuation by the plunger 102.

Normally the diaphragm 90 rests against the outer face of the end plate 70 which serves as a solid reinforcement to protect the diaphragm from the pressure of gases likely to exist within the case 63, and which preferably is dish-shaped so that the diaphragm will be subjected to the least possible strain in its movement from one extreme position to the other. When it is desired to reset the device 54, 56, the plunger 102 is moved inwardly, thereby acting through the pin 97 and the diaphragm 90 to move the pin 100 radially outwardly against the action of the spring 104 to lift the head 73 out of clutch engagement with the stop 59, without interrupting the hermetic seal. The side of the plunger 102 serves to lock the pin 97 in adjusted position (see Fig. 5). Thereupon, the outer screw member 56 can be forced inwardly to effect reverse rotation of the inner screw member 54 to the desired extent. For convenience in assembly, the screw member 56 may be locked in fully retracted position. To this end, the shell 94 is formed with an opening 105 adapted to be moved into registration with a recess 106 in the side of the case 63 for the insertion of a pin or other locking tool (not shown). When the assembly is completed, the locking pin is removed, and the plunger 102 is withdrawn from the pin 97. Thereupon, the device 54, 56 will adjust itself to define the proper radial clearance A.

For efficient and reliable operation, the free acting characteristics of the bearing surfaces of the radial clearance adjuster 52 should be preserved by proper lubrication and protection from the grit, dirt, moisture and other foreign matter which is likely to be present in the brake. If the interior of the adjuster were exposed to the atmosphere, even through a comparatively small vent, foreign matter might find its way between the bearing surfaces, and breathing would be permitted. Lubricant would be lost, and moisture or humidity entering with the air would be likely to cause corrosion. The relatively high temperatures resulting on occasion from the braking action would cause oxidation and sludging of the lubricant in the presence of the oxygen of the air. All these difficulties are definitely avoided by the hermetic seal provided by the diaphragm 90 and the bellows 91.

The circumferential adjuster 53 is similar in construction and mode of operation to the radial clearance stops 52, but by reason of its specific location and manner of association with the sections of the band 18 has a different function. Thus, the adjuster 53 is adapted to elongate freely when the brake is released in response to axial stress which will be set up as a result of outward adjustment of the radial stops 52, and will prevent shortening of the band assembly when the brake is applied. The primary function of the circumferential adjuster 53 may be said, therefore, to maintain automatically the proper length of the braking element 18 so that the range and phase of movement of the actuator 32 will remain constant, and that in the particular type of brake herein disclosed the band ends 24 and 25 in idle position will always engage the abutment 26, regardless of radial adjustment for wear.

In its preferred form, the circumferential adjuster 53 comprises two elongated cylindrical sleeves 107 and 108 which telescope for relative axial adjustment, and which are pivotally connected at their remote ends to brackets 109 and 110 secured to the adjacent ends 18ª and 18ᵇ of the separated sections of the band 18. Preferably, the brackets 109 and 110 are U-shaped in form with inwardly extending parallel walls 111 and 112 respectively which extend along opposite sides of the adjuster 53. In the present instance, the pivoted end of the outer sleeve 107, which in effect constitutes the case of the adjuster 53, is closed by an end wall 113, and is formed with a transverse bearing sleeve 114 rotatably confined between the walls 111 on a headed pivot bolt 115. Similarly, the pivoted end of the inner sleeve 108 is closed, and is formed with a transverse bearing sleeve 116 rotatably confined between the walls 112 on a pivot pin 117. Suitable cotter pins 118 are provided for holding the bolt 115 and the pin 117 in axial position in the bracket walls 111 and 112. To provide means for normally holding the bolt 115 against rotation, it is formed with a transverse bore 119 which is adapted to be located in registration with a bore 120 in one of the walls 111 for the reception of a removable locking pin 121.

The sleeve 108 is formed in its free end with internal screw threads 122 in coacting engagement with screw threads 123 on one end of a rotatable member 124 extending axially therefrom. The threads 122 and 123 have a steep non-locking lead. The sleeve 108 and the member 124 therefore are relatively rotatable when subjected to axial stress, and constitute a self-adjustable screw device.

Rigidly secured in the closed end of the sleeve 107, as by means of knurls 125, is a fixed plate 126. A stop 127 is mounted in the sleeve 107 against the plate 126, and formed on its exposed face with an annular series of clutch teeth 128. The adjacent end of the screw member 124 has an enlarged head 129 formed on its free end with an annular series of clutch teeth 130 adapted to coact with the teeth 128. A plurality of ball bearings 131 are confined between annular opposed raceways 132 and 133 formed respectively in the other end of the head 129 and a ring 134 encircling the screw member 124. The ring 134 is held in position by a split band 135 seated in a peripheral groove 136, and is adapted for movement into engagement with a shoulder 137 defined by a stop ring 138 secured in an inner peripheral groove 139 in the sleeve 107. Two coiled tension springs 140, anchored at their ends to laterally extending lugs 141 respectively on the side walls 111 and 112 of the brackets 109 and 110, tend to contract the adjuster 53, and to hold the teeth 130 and 131 in clutch engagement. These springs have a lower tensile strength than the brake retracting springs 27.

To provide an hermetic seal, a diaphragm 142 is clamped between the end wall 113 of the sleeve 107 and the plate 126, and a corrugated cylindrical bellows 143 encloses the sleeves 107 and 108. The ends of the bellows 143 are tightly clamped between two sets of concentric rings 144 and 145 respectively pressed onto the base ends of the sleeves 107 and 108. Enclosing the bellows 143 is an outer housing comprising two telescoping cylindrical shells 146 and 147. The inner shell 146 at one end is connected to the outer ring 144, and at the other end has an outer peripheral flange 148. The outer shell 147 at one end is secured to the outer ring 145, and at its free end has an inner peripheral flange 149. The flanges 148 and 149 are adapted for engagement to limit the maximum elongation of the adjuster 53. The hermetic seal has the same functions and advantages as in the radial adjusters 52.

The clutch teeth 128 and 130 may be held out of engagement by a pin 150 which has an enlarged head 151 bearing against the inner face of the diaphragm 142, and which extends slidably through a series of axial bores 152 in the plate 126 and the clutch disk 127 into an axial bore 153 in the end of the head 129. A recess 154 is formed in the outer face of the plate 126 about the pin 150 to permit flexure of the diaphragm 142 from the dish-shaped backing face of the wall 113 against which it is normally positioned. Extending slidably from the sleeve 114 through a bore 155 in the wall 113 into engagement with the outer face of the diaphragm 142 is a headed pin 156 in axial alignment with the pin 150. The outer end of the pin 156 is rounded for engagement with a transverse cam face 157 on the bolt 115. A compression spring spider 158 is mounted in the recess 154 in engagement with the head 151, and tends to retract the pin 150 from the head 129.

In operation, when the brake is released, the ends 24 and 25 are held against the abutment 26 by the retractile springs 27, and the sections of the band 18 are positioned against the radial stops 52 and have a predetermined clearance A with the drum. When the brake is applied, the circumferential adjuster 53 is placed under compression, thereby causing the clutch teeth 128 and 130 to lock the screw member 124 against rotation, and the band 18 is expanded into engagement with the drum 15. If the clearance is enlarged by reason of wear on the lining 19, the stops 52 will effect a compensatory adjustment, as the brake is applied, thereby enlarging the effective diameter of the band 18. Upon subsequently releasing the brake, the springs 27 will return the ends 24 and 25 against the abutment 26, and will cause the band sections through coaction with the stops 52 to elongate the circumferential adjuster 53 against the action of the springs 140. If the elongation is in excess of the distance necessary to bring the bearing ring 134 into engagement with the shoulder 137, the clutch teeth 128 and 130 will be separated, and axial stress will be placed on the threads 122 and 123 to effect rotation of the screw member 124 and thereby to increase the length of the brake band assembly.

To reset the adjuster 53 when the lining 19 is replaced, the pin 121 is removed, and then the bolt 115 is rotated to urge the pin 150 against the head 129, thereby opening the clutch 128, 130 and permitting reverse adjustment of the screw device by axial compression. The same result may be obtained, with the pin 121 in position, by turning the adjuster 53 on the bolt 115 relatively to the band end 18ª.

As in the radial stops 52, the weight of the moving parts, vibrations and particularly sharp up and down accelerations of the wheel, unless rendered ineffective, are likely to effect misadjustments of the circumferential adjuster 53. Misadjustments of the screw member 124 due to its own mass are prevented by a brake 159, similar to the brake 60. The brake 159 consists of a compression bow spring which is disposed in a tubular extension 127$^a$ on the clutch disk 127 and projecting into a recess 160 in the free end of the head 129, and which has outwardly bent ends 161 extending slidably through slots 162 into frictional engagement with the inner peripheral surface of the recess 160.

Acceleration of the wheel acting on the mass of the parts, for example the sections of the band 18, to which the circumferential adjuster 53 is directly attached are likely under certain conditions to subject the adjuster to very heavy extending forces. The circumferential adjuster 53 is most conveniently located in a vertical position diametrically opposite the actuator 32. If the wheel when traveling rapidly strikes a bump in the road, it will be thrown upwardly violently with a high acceleration. Thereafter, a downward acceleration of substantially equal value will obtain. The downward acceleration may be expressed by the following equation:

$$a = g \times \frac{L}{W}, \text{ where}$$

$g$ = gravity,
$L$ = the load placed on the wheel axle by the spring, and
$W$ = the weight of the wheel and axle and of the parts thereon.

The ratio of this acceleration to gravity, conveniently represented by the symbol $$\frac{a}{g}$$

may far exceed 1. Thus, if the weight of the parts is taken as 1000 pounds, and the load on the axle exclusive of the weight should be 5000 pounds, the $$\frac{a}{g}$$

would equal 5.

Any tension set up by the $$\frac{a}{g}$$

will tend to elongate the adjuster 53, and, unless counteracted, would be likely to overadjust the length of the braking element assembly, even to the extent of locking the band 18 against the drum 15 when the brake is released. Such extending force is fully counteracted by providing the springs 140 with sufficient strength. The springs 140, being weaker than the springs 27, however, will not prevent normal operation of the adjuster 53 in response to release of the brake. A similar problem does not arise in the radial adjusters 52, since the function of the latter is to follow the band 18 outwardly against the drum 15, and since the lost motion for the screw member 54 will always provide the desired radial clearance A when the band is retracted by the springs 27.

As an alternative measure, the adjuster 53 may be self-locking to prevent adjustment if the $$\frac{a}{g}$$

exceeds a predetermined value, the springs 140 being provided with sufficient strength to counteract the extending force resulting from any $$\frac{a}{g}$$

below such value. Thus, the clutch disk 127 is axially slidable on the pin 150, and is held against rotation in any axial position by a tongue 163 (see Fig. 11) on one end slidably disposed in a notch 164 in the end plate 126. A coiled spring 165, encircling the pin 150, is interposed under compression between the head 129 and the disk 127, and normally serves to hold the latter against the plate 126. If the $$\frac{a}{g}$$

exceeds a value determined by the pressure of the spring 165, the clutch disk 127 will leave the plate 126 under the influence of momentum, and follow up the head 129 to prevent separation of the clutch teeth 128 and 130, thereby locking the screw member 124 against rotation. Preferably, the clutch teeth 128 and 130 in this instance are crown ratchet teeth which will not tend to separate through mutual coaction when the screw member 124 is subjected to axial tension.

In the modified form of the invention illustrated in Figs. 12 to 14, the radial and circumferential self-adjusters for carrying out functions one and two hereinbefore defined, are suitably embodied in a mechanically operable internal multiple-shoe brake. The brake comprises a rotatable drum 15$^a$, and a fixed support 41$^a$ therein. Two ribbed arcuate shoes 18$^c$ and 18$^d$ are pivotally anchored on the support 41$^a$, and are faced with a suitable brake lining 19$^a$ engageable with the drum 15$^a$. Coiled tension springs 27$^a$ anchored to the support 41$^a$ tend to retract the shoes.

The free ends of the shoes 18$^c$ and 18$^d$ have oppositely acting crank connections with a rock shaft 167 rotatable in a bearing 168 on the support 41$^a$. Connected to the shaft 167 is an operating lever 169 adapted to be actuated against the retractile force of a spring 170 by a pull rod 171 to apply the brake. A notch 172 in the shaft 167 is engageable with a pin 173 on the support 41$^a$ to limit the retractile movement of the actuator. Two stops 52$^a$ are pivotally connected by means of pins 41$^b$ at opposite ends respectively to the support 41$^a$ and the associated brake shoes 18$^c$ and 18$^d$, and are automatically extensible in response to axial tension to maintain a predetermined braking clearance A regardless of wear on the lining 19$^a$. By reason of the direct or positive connections with the shoes by reason of the pins 41$^b$, the stops 52$^a$ need not comprise extending springs, corresponding to the springs 80.

Each of the adjusters 52$^a$ is like the circumferential adjuster illustrated in Fig. 8, except for the location of the pivotal connections by means of the pins 41$^b$ instead of the pins 115 and 117 and except for the substitution of the springs 140 by the springs 27$^a$ and connection of the latter to the ends of the pins 41$^b$, and hence the corresponding parts are identified by the same reference numerals plus the distinguishing letter $a$. Referring to Fig. 15, the transverse bearing sleeves 114$^a$ and 115$^a$ are disposed respectively between spaced lugs 176 rigid on the support or spider 41$^a$ and between the webs 112$^a$ on the free end of the shoe 18$^d$, and are pivotally connected thereto by the pins 41$^b$.

Two circumferential adjusters 53ª are interposed respectively in the connections between the free operative ends of the shoes 18ᶜ and 18ᵈ and the rock shaft 167. Each of the adjusters 53ª is automatically extensible in response to axial tension, and is provided at opposite ends with rounded portions 174 pivotally secured respectively in sockets 175 in the end of the associated shoe and the side of the shaft 167. Each of the sockets 175 has a restricted opening less in width than the diameter of the associated portion 174 so that the latter cannot be removed from the socket when subjected to a pull transversely of the shaft 167. The parts are adapted to be assembled by moving the rounded portions 174 axially of the shaft 167 into the sockets 175. The two sockets 175 in the shaft 167 are located at opposite sides of the axis. Referring to Fig. 16, each of the adjusters 53ª, except for the character of the pivotal connections just described and except for the elimination of springs corresponding to the springs 140, also in like the circumferential adjuster illustrated in Fig. 8, and corresponding parts are therefore identified by the same reference numerals plus the distinguishing letter b. It will be understood that the rounded portions 174 are integral respectively with the outer closed ends of the sleeves 107ᵇ and 108ᵇ. Since pivot pins are not employed, access to the pin 156ᵇ is obtained through a transverse bore 177. It will be evident that the springs 27ª, which are anchored at opposite ends by means of the pins 41ᵇ to the support 41ª and the shoes 18ᶜ and 18ᵈ, serve the dual function of retracting the shoes 18ᶜ and 18ᵈ when the brake is released, and of resisting elongation of the adjusters 53ª, thereby obviating the necessity for other springs corresponding to the springs 140. The springs 27ª are of sufficient strength to prevent overadjustment in response to any $$\frac{a}{g}$$

likely to arise, and hence the adjusters 53ª are not self-locking. In all other material respects, the adjusters 53ª are substantially the same in construction and operation as the adjuster 53.

The circumferential adjusters 53ª will elongate automatically, as necessitated by elongation of the stops 52ª, to permit the notch 172 always to return to the pin 173 in the release movement of the brake, and hence serve in effect to lengthen the shoe assembly so as to maintain constant the extent and phase of rotation of the actuator shaft 167. Thus, foreshortening of the moment arm of the actuator is prevented.

In all of the adjusters described, the advantages and purpose of the low pitch of the screw threads, the hermetic seal, and other features common thereto are the same as those in the adjusters 52.

I claim as my invention:

1. A wear compensating device for maintaining a predetermined operating slack comprising, in combination, a self-adjusting unit having two relatively rotatable screw members with non-locking coacting threads and being adjustable in axial length through relative rotation in one direction when subjected to an axial force in one direction, and a housing enclosing said unit and being hermetically sealed to prevent the loss or deterioration of lubricant and the entry of foreign matter.

2. A wear compensating device for maintaining a predetermined operating slack comprising, in combination, a self-adjusting unit having two relatively rotatable screw members with non-locking coacting threads and being adjustable in axial length through relative rotation in one direction when subjected to an axial force in one direction, and an hermetically sealed housing enclosing the bearing surfaces of said unit and including a yieldable corrugated cylindrical bellows.

3. A wear compensating device for maintaining a predetermined operating slack comprising, in combination, means defining an idle rest stop and a spaced opposed operating stop, a self-adjusting unit having two relatively rotatable screw members with non-locking coacting threads and having a lost motion between said stops and being adjustable in axial length through relative rotation in one direction when subjected to an axial force in one direction while against said operating stop, and clutch means adapted to be opened and closed upon movement of said unit reversely through said lost motion, and being operable to prevent relative rotation of said members in a reverse direction when said unit is located against said rest stop, said clutch means comprising short V-shaped teeth projecting axially of said unit and arranged in two coacting sets annularly and concentrically about the axis of said unit.

4. A wear compensating device for maintaining a predetermined operating slack comprising, in combination, means defining an idle rest stop and a spaced opposed operating stop, a self-adjusting unit having two relatively rotatable screw members with non-locking coacting threads and having a lost motion between said stops and being adjustable in axial length through relative rotation in one direction when subjected to an axial force in one direction while against said operating stop, and clutch means adapted to be opened and closed upon movement of said unit reversely through said lost motion, and being operable to prevent relative rotation of said members in a reverse direction when said unit is located against said rest stop, and means available at will for opening said clutch means to permit manual resetting of said unit.

5. A wear compensating device for maintaining a predetermined operating slack comprising, in combination, means defining an idle rest stop and a spaced opposed operating stop, a self-adjusting unit having two relatively rotatable screw members with non-locking coacting threads and having a lost motion between said stops and being adjustable in axial length through relative rotation in one direction when subjected to an axial force in one direction while against said operating stop, and clutch means adapted to be opened and closed upon movement of said unit reversely through said lost motion, and being operable to prevent relative rotation of said members in a reverse direction when said unit is located against said rest stop, means for enclosing the bearing surfaces of said unit and said clutch means in an hermetically sealed space, and means available at will for opening said clutch means to permit resetting of said unit without breaking the hermetic seal.

6. A wear compensating device for maintaining a predetermined operating slack comprising, in combination, an elongated tubular case closed at one end, an end face clutch element in said closed end, a unit having a non-rotatable screw member projecting from the other end of said case and having a second screw member rotatable in said case to adjust the length of said unit, an end face clutch element on said rotatable member for coacting with said first mentioned element to prevent rotation in one direction, and manually operable means for separating said clutch elements.

7. A wear compensating device for maintaining a predetermined operating slack comprising, in combination, an elongated tubular case closed at one end, an end face clutch element in said closed end, a unit having a non-rotatable screw member projecting from the other end of said case and having a second screw member adapted for limited axial movement in said case and for rotation to effect axial adjustment of said first mentioned member, an end face clutch element on said rotatable member for coacting with said first mentioned element, a yieldable diaphragm hermetically sealing the closed end of said case, a pin movable with said diaphragm and adapted for end engagement with said rotatable member to separate said clutch elements, and means for flexing said diaphragm.

8. A wear compensating device for maintaining a predetermined operating slack comprising, in combination, an elongated tubular case closed at one end, an end face clutch element in said closed end, a unit having a non-rotatable screw member projecting from the other end of said case and having a second screw member adapted for limited axial movement in said case and for rotation to effect axial adjustment of said first mentioned member, an end face clutch element on said rotatable member for coacting with said first mentioned element, a yieldable diaphragm hermetically sealing the closed end of said case, a pin seated against one side of said diaphragm and adapted to be moved thereby into axial engagement with said rotatable member to separate said clutch elements, a pin extending through said closed end of said case into engagement with the other side of said diaphragm, and a transversely adjustable cam plunger adapted for engagement with said last mentioned pin to actuate the latter against said diaphragm and to lock the latter in actuated position.

9. A wear compensating device for maintaining a predetermined operating slack comprising, in combination, an elongated case closed at one end, a positive end face clutch element in said closed end, a unit having a non-rotatable screw member projecting from the other end of said case and having a second screw member adapted for limited axial movement in said case and for rotation to effect axial adjustment of said first mentioned member, a positive end face clutch element on said rotatable member for coacting with said first mentioned element, a yieldable diaphragm hermetically sealing the closed end of said case, a pin seated against one side of said diaphragm and adapted to be moved thereby into axial engagement with said rotatable member to separate said clutch elements, a pin extending through said closed end of said case into engagement with the other side of said diaphragm, and a relatively rotatable cam for actuating said last mentioned pin against said diaphragm.

10. A wear compensating device for maintaining a predetermined operating slack comprising, in combination, an elongated peripherally closed case, a yieldable diaphragm hermetically closing one end of said case, an end face clutch element in said closed end, a unit having a non-rotatable screw member projecting from the other end of said case and having a second screw member adapted for limited axial movement in said case and for rotation to effect axial adjustment of said first mentioned member, an end face clutch element on said rotatable member for coacting with said first mentioned element, a yieldable bellows providing an hermetic seal between said case and the projecting end of said non-rotatable member, a pin movable with said diaphragm and adapted for end engagement with said rotatable member to separate said clutch elements, and means for flexing said diaphragm.

11. A wear compensating device for maintaining a predetermined operating slack comprising, in combination, an elongated case closed at one end and defining an inwardly facing annular shoulder, a rotatable screw member having an enlarged head adapted for engagement with said shoulder, a non-rotatable screw member in threaded engagement with said rotatable member and projecting from said case, said members being adapted for relative rotation when subjected to axial force in one direction, and a corrugated axially extensible and contractible generally cylindrical bellows having an air-tight seal at its ends respectively with the exterior of said case and the projected end of said non-rotatable member.

12. In a brake, in combination with a stationary support, a drum and a friction element engageable with said drum, a radial clearance stop for said element comprising a case mounted on said support and defining a rest stop and a spaced opposed operating stop, two relatively rotatable screw members constituting an adjusting unit and having non-locking coacting threads, one of said members being non-rotatable and axially movable with said element, the other of said members having a limited axial movement with said one member through a limited clearance from said rest stop into engagement with said operating stop, and then being rotatable against said operating stop by reason of the coaction of said threads to effect an elongation of said unit, clutch means for preventing rotation of said other member when in retracted position against said rest stop, and brake means for frictionally resisting rotation of said other member.

13. In a brake, in combination with a stationary support, a drum and a friction element engageable with said drum, a radial clearance stop for said element comprising two relatively rotatable screw members having non-locking coacting threads, one of said members being axially movable with said element from an idle position first through a predetermined clearance and then to effect relative rotation between said members by reason of the coaction of said threads and thereby to effect an elongation of said stop, fixed means for defining said idle position, and brake means for resisting said relative rotation.

14. In a brake, in combination with a stationary support, a drum and a friction element engageable with said drum, a radial clearance stop for said element comprising two relatively rotatable screw members having non-locking coacting threads, one of said members being axially movable with said element from an idle position first through a predetermined clearance and then to effect relative rotation between said members by reason of the coaction of said threads and thereby to effect an elongation of said stop, fixed means for defining said idle position, clutch means for preventing relative rotation of said members when said one member is in idle position, and friction means for resisting said relative rotation when said clutch means is open.

15. In a brake, in combination with a stationary support, a drum and a friction element engageable with said drum, a radial clearance stop for said element comprising two relatively rotatable screw members having non-locking coacting threads, one of said members being axially movable with said element from an idle position first through a predetermined clearance and then to effect relative rotation between said members by reason of the coaction of said threads and thereby to effect an elongation of said stop, fixed means for defining said idle position, and means for hermetically sealing said threads within an enclosed space.

16. In a brake, in combination with a stationary support, a brake drum, and a friction element engageable with said drum, a radial clearance device for limiting the retractile movement of said element and comprising a case mounted on said support and defining opposed stops spaced generally radially of said band, two screw members having non-locking coacting threads and constituting a self-adjustable unit movably disposed in said case for engagement in retracted position against one of said stops, one of said members being non-rotatable and having an end projecting from said case for movement with said element, the other of said members being rotatable and having an end thrust anti-friction bearing adapted for engagement with the other of said stops upon movement of said unit from said retracted position through a predetermined limited distance, and clutch means for preventing rotation of said rotatable member to prevent axial contraction of said unit when in retracted position.

17. In a brake, in combination with a stationary support, a brake drum, and a friction element engageable with said drum, a radial clearance device for limiting the retractile movement of said element and comprising a case mounted on said support and defining opposed stops spaced generally radially of said band, two concentric screw members having non-locking coacting threads and constituting a self-adjustable unit movably disposed in said case for engagement in retracted position against one of said stops, the outer member being non-rotatable and having an end projecting slidably from said case for movement with said element, the inner member being rotatable and having an enlarged head adapted for end bearing engagement with the other of said stops upon movement of said unit from said retracted position through a predetermined limited distance, and clutch means for preventing rotation of said rotatable member to prevent axial contraction of said unit when in retracted position.

18. In a brake, in combination with a stationary support, a brake drum, and a friction element engageable with said drum, a radial clearance device for limiting the retractile movement of said element and comprising a case mounted on said support and defining opposed stops spaced generally radially of said band, two concentric screw members having non-locking coacting threads of a high lead and relatively low pitch and constituting a self-adjustable unit movably disposed in the center of said case for engagement in retracted position against one of said stops, one of said members being non-rotatable and having an end projecting from said case for movement with said element, a coiled compression spring outside of said unit for urging said one member into engagement with said element, the other of said members being rotatable and adapted for engagement with the other of said stops upon movement of said unit from said retracted position through a predetermined limited distance, brake means resisting rotation of said other member, and clutch means for preventing rotation of said rotatable member to prevent axial contraction of said unit when in retracted position.

19. In a brake, in combination with a stationary support, a brake drum, and a friction element engageable with said drum, a radial clearance device for limiting the retractile movement of said element and comprising a case mounted on said support and defining opposed fixed stops, two screw members having non-locking coacting threads and constituting a self-adjustable unit movably disposed in said case for engagement in retracted position against one of said stops, one of said members being non-rotatable and having an end projecting from said case for movement with said element, the other of said members being rotatable and adapted for engagement with the other of said stops upon movement of said unit from said retracted position through a predetermined limited distance and being formed with a central recess, a bow compression spring mounted on said one stop and disposed in said recess and having free ends extending into frictional engagement with the inner peripheral surface of said recess to brake the rotation of said other member, and clutch means for preventing rotation of said rotatable member to prevent axial contraction of said unit when in retracted position.

20. In a brake, in combination with a stationary support, a brake drum, and a friction element engageable with said drum, a radial clearance device for limiting the retractile movement of said element and comprising a case mounted on said support and defining opposed stops spaced generally radially of said band, two screw members having non-locking coacting threads and constituting a self-adjustable unit movably disposed in said case for engagement in retracted position against one of said stops, one of said members being non-rotatable and having an end projecting from said case for movement with said element, the other of said members being rotatable and adapted for engagement with the other of said stops upon movement of said unit from said retracted position through a predetermined limited distance, clutch means for preventing rotation of said rotatable member to prevent axial contraction of said unit when in retracted position, a coiled compression spring encircling said case and acting to urge the projected end of said non-rotatable member against said element, and a corrugated cylindrical bellows encircling said spring and having a tight connection at its ends respectively with said case and the projected end of said non-rotatable member.

21. In a brake, in combination with a stationary support, a brake drum, and a friction element engageable with said drum, a radial clearance device for limiting the retractile movement of said element and comprising a case mounted on said support defining opposed stops spaced generally radially of said band, two screw members having non-locking coacting threads and constituting a self-adjustable unit movably disposed in said case for engagement in retracted position against one of said stops, one of said members being non-rotatable and having an end projecting from said case for movement with said element, the other of said members being rotatable and adapted for engagement with the other of said stops upon movement of said unit from said retracted position through a predetermined limited distance, clutch means for preventing rotation of said rotatable member to prevent axial contraction of said unit when in retracted position, a coiled compression spring encircling said case and acting to urge the projected end of said non-rotatable member against said element, a corrugated cylindrical bellows encircling said spring and having a tight connection at its ends respectively with said case and the projected end of said non-rotatable member, a cap positioned over said projected end and having a cylindrical sleeve enclosing said bellows, and means coacting with said sleeve to limit the outward movement of said non-rotatable member.

22. In a brake, in combination with a stationary support, a brake drum, and a friction element engageable with said drum, a radial clearance device for limiting the retractile movement of said element and comprising a case mounted on said support and defining opposed stops spaced generally radially of said band, two screw members having non-locking coacting threads and constituting a self-adjustable unit movably disposed in said case for engagement in retracted position against one of said stops, one of said members being non-rotatable and having an end projecting from said case for movement with said element, the other of said members being rotatable and adapted for engagement with the other of said stops upon movement of said unit from said retracted position through a predetermined limited distance, clutch means for preventing rotation of said rotatable member to prevent axial contraction of said unit when in retracted position, brake means for resisting rotation of said rotatable member, a cylindrical shell movable with said non-rotatable member and enclosing the outer end of said case, an inner shell telescoping with the free end of said first mentioned shell and adapted to coact therewith to limit the outward movement of said non-rotatable member, and means for locking said outer shell in retracted position.

23. A vehicle brake comprising, in combination, a rotatable drum and a braking mechanism for said drum, said mechanism including a movement limiting device with screw members having coacting axially non-locking threads and self-adjustable axially in response and proportionately to excessive movement of said mechanism, and stop means for limiting the extent of adjustment of said device in the direction of said movement.

24. A vehicle brake comprising, in combination, a rotatable drum and a braking mechanism for said drum, said mechanism including an elongated movement limiting self-adjustable screw device automatically extensible in response to excessive movement, and a housing having telescoping sleeves enclosing said device and formed with spaced interengageable abutments for limiting the maximum extension of said device.

25. A vehicle brake comprising, in combination, a rotatable drum and a braking mechanism for said drum, said mechanism including a self-adjustable movement limiting device comprising two respectively rotatable and non-rotatable screw members with non-locking coacting threads relatively axially adjustable in response to an axial force in one direction, and brake means operable in all relative axial positions of said members for resisting relative rotation of said members.

26. A vehicle brake comprising, in combination, a rotatable drum and a braking mechanism for said drum, said mechanism including a self-adjustable movement limiting device comprising a case, a member rotatable in said case and confined against substantial axial movement, a non-rotatable member axially slidable in said case, said members having non-locking coacting threads of a relatively high lead and low pitch and constituting a unit adjustable in length in response to an axial force in one direction, and brake means for resisting rotation of said first mentioned member.

27. A vehicle brake comprising, in combination, a rotatable drum and a braking mechanism for said drum, said mechanism including a self-adjustable movement limiting device comprising a case, a member rotatable in said case and confined against substantial axial movement, a non-rotatable member axially slidable in said case, said members having non-locking coacting threads of a relatively high lead and low pitch and constituting a unit adjustable in length in response to an axial force in one direction, and means automatically operable in response to a predetermined momentum to lock said unit against adjustment.

28. A vehicle brake comprising, in combination, a rotatable drum, a brake element engageable with said drum, spring means for retracting said element from said drum and a stop device associated with said element to limit the movement thereof in one direction, said device comprising a self-adjustable unit having two relatively rotatable screw members with non-locking coacting threads and being adjustable in length when subject to axial tension, and spring means other than said first mentioned spring means for placing said unit under compression and of a strength sufficient to counteract a downward acceleration of said brake bearing a ratio to gravity up to five to prevent adjustment in response to momentum.

29. A vehicle brake comprising, in combination, a rotatable drum, a brake element engageable with said drum, spring means tending to retract said element from said drum, an actuator coacting with one end of said element for engaging said element with said drum, stop means for limiting the retractile position of said element, a stop device associated with the other end of said element to limit the movement thereof in one direction by said actuator, and being automatically extensible in response to said spring means, and spring means of lower power than said first mentioned spring means and acting to resist extension of said device.

30. A brake comprising, in combination, a rotatable drum, stationary abutment means, a pair of floating friction elements engageable with said drum and having operative ends adapted to be retracted against said abutment means, spring means tending to retract said elements, a power actuator for spreading said ends of said elements, radial clearance means for limiting the retractile movement of said elements from said drum and being adjustable to vary the idle radial position of said elements, and a floating circumferential adjuster pivotally connecting the other two ends of said elements, said adjuster being automatically extensible in response to circumferential tension adapted to be exerted by said spring means in coaction with said clearance means through said elements, and spring means of lower power than said first mentioned spring means for resisting elongation of said adjuster.

31. A brake comprising, in combination, a rotatable drum, stationary abutment means, a pair of floating friction elements engageable with said drum and having operative ends adapted to be retracted against said abutment means, spring means tending to retract said elements, a power actuator for spreading said ends of said elements, radial clearance means for limiting the retractile movement of said elements from said drum and being adjustable to vary the idle radial position of said elements, and a floating circumferential adjuster pivotally connecting the other two ends of said elements, said adjuster being automatically extensible in response to circumferential tension adapted to be exerted by said spring means in coaction with said clearance means through said elements, and spring means of lower power than said first mentioned spring means for resisting elongation of said adjuster, said adjuster comprising a rotatable screw member constrained against substantial axial movement, a non-rotatable axially adjustable screw member in non-locking threaded engagement with said first mentioned member, a positive clutch for preventing rotation of said rotatable member in response to axial compression on said members, and brake means for resisting rotation of said rotatable member.

32. A brake comprising, in combination, a rotatable drum, stationary abutment means, a pair of floating friction elements engageable with said drum and having operative ends adapted to be retracted against said abutment means, spring means tending to retract said elements, a power actuator for spreading said ends of said elements, radial clearance means for limiting the retractile movement of said elements from said drum and being adjustable to vary the idle radial position of said elements, and a floating circumferential adjuster pivotally connecting the other two ends of said elements, said adjuster being automatically extensible in response to circumferential tension adapted to be exerted by said spring means in coaction with said clearance means through said elements, said adjuster comprising a case pivotally connected to one of said elements and defining opposed stops, two concentric screw members having non-locking coacting threads and constituting a self-adjustable unit movably disposed in said case for engagement in retracted position against one of said stops, the outer member being non-rotatable and having an end projecting slidably from said case for pivotal connection to the other of said elements, the inner member being rotatable and having an enlarged head adapted for end bearing engagement with the other of said stops upon movement of said unit from said retracted position through a predetermined limited distance, and end face clutch means formed on said one stop and said head for preventing rotation of said rotatable member to prevent axial contraction of said unit when in retracted position, and adapted to open upon movement of said unit out of retracted position.

33. A brake comprising, in combination, a rotatable drum, stationary abutment means, a pair of floating friction elements engageable with said drum and having operative ends adapted to be retracted against said abutment means, spring means tending to retract said elements, a power actuator for spreading said ends of said elements, radial clearance means for limiting the retractile movement of said elements from said drum and being adjustable to vary the idle radial position of said elements, and a floating circumferential adjuster pivotally connecting the other two ends of said elements, said adjuster being automatically extensible in response to circumferential tension adapted to be exerted by said spring means in coaction with said clearance means through said elements, said adjuster comprising a case pivotally connected to one of said elements and defining an operating stop and an opposed abutment, a freely slidable non-rotatable end face clutch element adapted for engagement with said abutment, two concentric screw members having non-locking threads and constituting a self-adjustable unit, the outer member being non-rotatable and having an end pivotally connected to the other of said elements, the inner member being rotatable and having an end face clutch element engageable in one position with said first mentioned clutch element to prevent rotation and being movable under tension into engagement with said stop to separate said clutch elements, and yieldable means tending to hold said first mentioned clutch element against said abutment and permitting said clutch elements to remain in engagement in the event of a predetermined momentum.

34. A brake comprising, in combination, a rotatable drum, stationary abutment means, a pair of floating friction elements engageable with said drum and having operative ends adapted to be retracted against said abutment means, a power actuator for spreading said ends of said elements, radial clearance means for limiting the retractile movement of said elements from said drum and being automatically adjustable to maintain a predetermined braking clearance regardless of wear, and a floating circumferential adjuster pivotally connecting the other two ends of said elements, said adjuster comprising two relatively rotatable screw members having non-locking coacting threads and pivotally connected respectively to said elements, one of said members being non-rotatable, the other of said members having a limited axial movement relative to the associated element and being rotatable upon coaction of said threads in response to axial tension, clutch means for preventing rotation of said rotatable member in response to axial compression, spring means resisting elongation of said adjuster, and friction means yieldably resisting rotation of said rotatable member.

35. In a brake, an automatically extensible adjuster comprising, in combination, a cylindrical case open at one end and adapted to be anchored at the other end, a non-rotatable screw member extending slidably into the open end of said case and adapted to be anchored at its outer end, the inner end of said screw member being formed with internal non-locking threads having a high lead and a relatively low pitch, an axially movable clutch element mounted in said case, spring means tending to hold said clutch element against the pivoted end of said case, and a rotatable screw member having external non-locking threads in coacting engagement with said first mentioned threads and having a clutch element adapted for engagement with said first mentioned element and having a limited axial movement in said case to open and close said clutch elements.

36. A vehicle brake comprising, in combination, a stationary support, a rotatable drum, a brake shoe pivotally anchored at one end to said support, an actuator having a connection with the other end of said shoe and being movable out of a predetermined idle position to engage said shoe with said drum, yieldable means tending to return said actuator to idle position, an adjustable radial clearance stop for said shoe, and yieldable means tending to retract said shoe against said stop, said connection including a self-adjustable non-locking screw device automatically extensible in response to axial tension and operable to permit return of said actuator to idle position regardless of the retracted position of said shoe.

37. A wear compensating device for maintaining a predetermined operating slack comprising, in combination, a sleeve member having internal longitudinal splines, a non-rotatable screw member having external longitudinal splines slidably coacting with said first mentioned splines, stop means for limiting the outward movement of said screw member in said sleeve member to prevent disengagement of said splines, a rotatable screw member in said first mentioned screw member, said screw members having coacting axially non-locking threads and constituting a self-adjusting unit adjustable automatically in length when subjected to an axial force in one direction, and means for locking said screw members against relative rotation when said unit is subjected to an axial force in the opposite direction.

38. In a brake, in combination with a stationary support, a drum, and a friction element engageable with said drum, a stop for limiting the retractile movement of said element from said drum comprising, in combination, two relatively rotatable screw members constituting an adjusting unit and having non-locking coacting threads, one of said members having a limited axial movement to define a release clearance between said drum and said element and the other of said members having a freely separable operative connection with said element for synchronous movement therewith, spring means for maintaining said connection, one of said members being non-rotatable and the other of said members being rotatable, whereby said unit is automatically adjustable in length when said threads are subjected to an axial pull by said spring means after movement through said clearance, and means for locking said members against relative rotation when said threads are subjected to axial compression.

39. A wear compensating device for maintaining a predetermined operating slack comprising, in combination, an elongated case closed at one end and defining an inwardly facing annular shoulder, a rotatable screw member having an enlarged head adapted for engagement with said shoulder, a non-rotatable screw member in threaded engagement with said rotatable member and projecting from said case, said members being adapted for relative rotation when subjected to axial force in one direction, and an axially extensible and contractible generally cylindrical bellows of yieldable air impervious material having an air-tight seal at its ends respectively with the exterior of said case and the projected end of said non-rotatable member.

40. A compensating device for maintaining a predetermined operating slack comprising, in combination, a case defining a rest stop and a spaced opposed operating stop, two relatively rotatable screw members constituting an adjustable unit disposed in said case and having non-locking coacting threads, one of said members being non-rotatable and axially movable, the other of said members having a limited axial movement with said one member through a limited clearance from said rest stop into position for engagement with said operating stop and being rotatable against said operating stop by reason of the coaction of said threads to effect an elongation of said unit when subjected to an axial extending force, clutch means for preventing rotation of said other member when in position against said rest stop, and brake means for frictionally resisting rotation of said other member.

HOWARD D. COLMAN.